United States Patent [19]
Hicks

[11] 3,738,321
[45] June 12, 1973

[54] ANIMAL MILKING APPARATUS

[75] Inventor: Mervyn Lance Hicks, Taranaki, New Zealand

[73] Assignee: Turn-Styles Limited, Stratford, New Zealand

[22] Filed: Apr. 23, 1971

[21] Appl. No.: 136,783

[30] Foreign Application Priority Data

Apr. 24, 1970 New Zealand................... 159950

[52] U.S. Cl............................ 119/14.45, 119/14.04
[51] Int. Cl. ............................................ A01j 09/08
[58] Field of Search...................... 119/14.08, 14.1, 119/14.45, 14.04

[56] References Cited
UNITED STATES PATENTS

| | | | |
|---|---|---|---|
| 3,556,053 | 1/1971 | Padman et al. | 119/14.08 |
| 3,603,292 | 9/1971 | Finch | 119/14.08 |
| 3,373,761 | 3/1968 | Flocchini | 119/14.08 X |
| 3,246,631 | 4/1966 | Holm | 119/14.08 X |
| 3,593,687 | 7/1971 | Clegg | 119/14.1 |

*Primary Examiner*—Hugh R. Chamblee
*Attorney*—Watson, Cole, Grindle & Watson

[57] ABSTRACT

Means for supporting a teat cup assembly of milking apparatus in a position adjacent a milking stall whereby the teat cup assembly is supported above the floor of the stall and readily accessible to a milker. The support means includes a hinged arm so that the teat cup assembly may be supported at or near the outer end of such arm, and the teat cup assembly is supported in a retractible manner whereby it may immediately retract to a "home" position supported by the arm upon removal of the teat cups from a milked animal and so that the teat cup assembly cannot fall and contact the floor of the stall on removal from the animal. A vacuum supply cut-off device is associated with the retractible support means and the vacuum supply hose for the teat cup assembly to provide an arrangement whereby the vacuum supply to a teat cup assembly fitted to an animal can be cut off to permit the teat cup assembly to fall away from the animal with the result that the retractible support means immediately comes into operation to retract the teat cup assembly to the "home" and supported position without manual effort.

9 Claims, 2 Drawing Figures

PATENTED JUN 12 1973  3,738,321
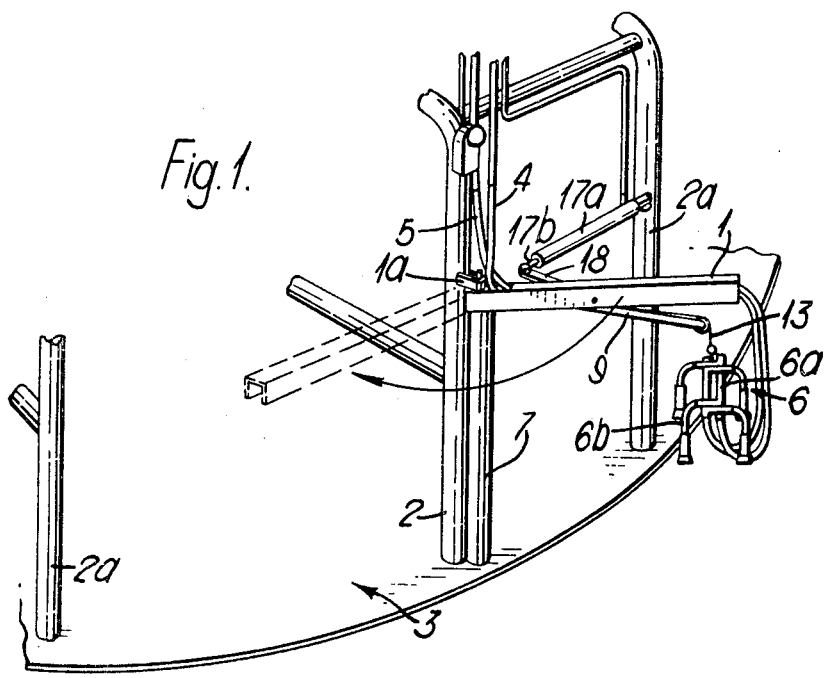
Fig.1.
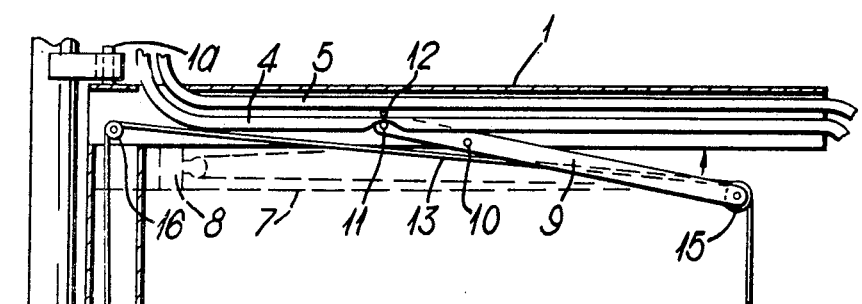
Fig.2.
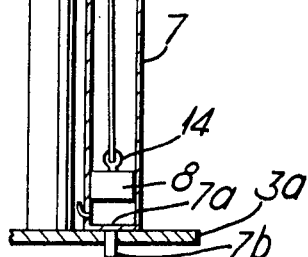
INVENTOR
Mervyn Lancs Hicks
BY
Watson, Cole, Grindle & Watson
ATTORNEYS

ANIMAL MILKING APPARATUS

This invention relates to animal milking apparatus and is more particularly concerned with means for supporting the teat cup assemblies of milking apparatus in milking sheds, and the removal of the teat cup assemblies from the animal after milking.

An object of this invention is to reduce the manpower and time required in milking operations, particularly in the removal of the teat cup from a cow or other animal that has been milked.

Another object of this invention is to provide support means for supporting the teat cup assembly above the floor of a milking stall, and means to shut off the vacuum supply to the teat cups substantially simultaneous with automatic retraction of the teat cup assembly to the supported position after an animal has been milked.

Other objects and advantages of the invention will become apparent from the ensuing description.

According to this invention therefor there is provided teat cup support and removal means comprising a support member arranged for disposition adjacent a milking stall, retractible support means associated with the support member and connected to the teat cup assembly of milking apparatus for the stall and at a point near the teat cups, and a vacuum supply cut-off device associated with the retractible support means and the source of vacuum supply and operable so that the teat cup assembly can be retracted for support by the support member above the floor of the stall when vacuum supply to the teat cup assembly is cut off and the teat cups are removed from the animal after milking.

The invention will now be described by way of example and with reference to the accompanying drawings, in which:

FIG. 1 is a perspective view illustrating part of a cow bail or stall provided with apparatus in accordance with the invention and with a milking teat cup assembly supported in the non-operative position, and FIG. 2 is a sectional view of the apparatus more particularly illustrating its construction and operation.

According to the illustrated aspect of the invention, the support member comprises a generally horizontal arm 1 which can be hingeably mounted on such as a post or dividing wall 2 of a stall 3 in a milking shed so as to be hingeable about its hinge connection 1a to a position convenient for use of the apparatus in milking an animal, or hinged out of the way when not required for use (in FIG. 1 the arm 1 is shown in full in the hinged out position, and in broken outline for the operative position). The arm 1 can be in the form of an inverted channel housing through which portions of the usually provided flexible vacuum supply/milk return and pulsator hoses, 4 and 5 respectively, connected to the milk cup assembly (indicated by the arrow 6) can pass; the hoses 4 and 5 passing into the upper part of the arm 1 at or towards the hinged end thereof, such as from overhead vacuum and milk lines (not shown), and passing out from the free end of the arm 1 to the milking claw and teat cup assembly 6.

For the retraction means, there is provided an open ended cylinder 7 with a piston member 8 slidably located therein, the piston 8 being movable for example either by means of hydraulic pressure or pneumatic pressure or by the application of vacuum to the cylinder 7 so that the piston 8 may be drawn or otherwise forced in either direction longitudinally within the cylinder 7. The cylinder 7 can be mounted vertically on or adjacent the post or wall 2 of the milking stall 3, with its open end uppermost, below the hinge connection 1a of the arm 1 and may have a base pivot connection 7b with the stall floor or platform 3a, pivot connections 1a and 7b being aligned. Alternatively the cylinder 7 can be disposed horizontally below and/or within the arm 1 (as indicated in broken outline in FIG. 2) to extend in the same direction as the arm 1 and be movable with the arm 1.

A lever member 9 is also located within the arm 1 to extend generally longitudinally thereof but at an inclination to the longitudinal axis thereof, the lever 9 being mounted for pivotal movement about a horizontal transverse axis or pivot pin 10 extending between the side walls of the arm housing at a point below the vacuum supply hose 4, (and above the piston 8 and cylinder 7 arrangement when disposed horizontally below the arm 1). The lever 9 has a short inner end portion extending inwardly towards the hinged end of the support arm 1 from the pivot connection 10 of the lever 9 and such inner end portion of the lever may have a transverse bar 11 which is arranged to bear against the underside of the vacuum hose 4 within the support arm 1; and the remaining longer portion of the lever 9 extends downwardly and outwardly (to one or both sides of the cylinder 7 when disposed horizontally) to have its outer free end portion terminating at or near the outer lower end portion of the support arm 1. It will thus be seen that by exerting downward pressure on the outer end portion of the lever 9, the inner end portion will be pivoted upwardly to compress the vacuum hose 4 and thus cut off the source of vacuum supply to the teat cup assembly 6; a transverse pinch bar or plate member 12 may be interposed between the vacuum supply hose/milk return hose 4 and pulsator hose 5 within the housing of the support arm 1 and above the transverse bar 11 of the lever 9 so that the vacuum hose 4 may be squeezed or pinched between the lever bar 11 and upper transverse bar or plate 12.

To effect the required downward thrust of the outer portion of the lever 9 to cut off the vacuum supply to the teat cup assembly 6, and at the same time to effect retraction and support of the teat cup assembly 6 above the floor of the stall, a flexible link member 13 (such as a cable or rope or chain — a rope or cord of nylon or like material is particularly suitable) has one end 14 either secured directly to the piston 8 or near the open upper or outer end of the cylinder 7 (for example to the stall post or wall 2 when the or cylinder 7 is vertical or the outer end portion of the support arm 1 when the cylinder 7 is horizontal) to provide an external fixed connection and has its other end secured to a point near the teat cups, e.g., at or near the milking claw 6a to which the teat cups 6b are connected. Where an external fixed connection is provided the intermediate portion of the flexible member 13 passes from the fixed connection 13a into the open end of the cylinder 7 for location about a pulley wheel 14 directly or indirectly connected to the piston 8, and thence outwardly towards the outer end of the support arm 1 and over a pulley wheel 15 provided at the outer lower end of the lever arm 9 to extend downwardly and outwardly to its connection with the teat cup assembly 6. Where the cylinder 7 is disposed in the vertical position (as illustrated in full line) a jockey wheel or pulley 16 for the flexible link member 13 can be mounted at the upper open end of the cylinder 7.

By the aforegoing arrangement, when the weight of the milking claw and teat cup assembly 6 is taken by an operator in fitting the teat cups 6b to an animal to be milked there is no downward thrust on the lever 9 at its outer end and the vacuum supply hose 4 is free to supply the vacuum to the teat cups 6b which may then be engaged with and supported by the animals udder. At this point the piston 8 is towards the outer end of the cylinder 7.

Upon exerting the appropriate force to the cylinder 7 and piston 8, whether hydraulically or pneumatically or by the application of vacuum, to retract the piston 8 back towards the inner end or base 7a of the cylinder 7, the flexible link member 13 is drawn inwardly with the piston to retract the flexible member 13 and draw the teat cup assembly 6 "home" towards its supported position at the outer end of the support arm 1. As the piston 8 commences its retraction the flexible link member 13, combined with the weight of the hoses 4 and 5 to the claw assembly 6, exerts downward pressure on the pulley 15 at the outer end of the lever 9 and over which it passes to thus exert the required downward pressure on the outer portion of the lever 9 and cause upward movement of the inner end portion of the lever 9 to squeeze the vacuum supply hose 4 and cut off the vacuum supply to the teat cup assembly 6. Upon the vacuum supply to the teat cups 6b being cut-off the teat cup assembly 6 will automatically fall away from the animals udder permitting the assembly 6 to be retracted immediately as the piston 8 moves inwardly of its cylinder 7 and thus preventing the teat cup assembly 6 with teat cups from contacting the floor of the milking stall 3 after removal from the animal.

The apparatus in accordance with this invention can be applied to individual stalls in conventional milking sheds such as those having the herringbone pattern of milking stalls, but the invention is also particularly applicable to rotary milking platforms, such as those the subject of our U.S. Pat. specification No. 110,822, which include circular slowly rotating platforms each having a plurality of stalls located thereon and towards the periphery of such platform. In the constructions described in our specification No. 110,822 the stalls are radially or tangentially positioned and the animals are arranged to be located therein with their heads towards the center part of the platform and their tails at the periphery. Thus a teat cup support and removal means in accordance with the present invention can be provided at each dividing wall between the stalls at the periphery of the rotatable platform.

Various means can be employed for actuation of the retraction piston 8 and cylinder 7 arrangement for the apparatus and it is envisaged that actuation can be by way of a manual control switch or valve located at the support and retraction means or a manual actuating switch or control valve arrangement can be provided remote from the milking stall so that, for example, an operator may be able to control the teat cup removal and retracting apparatus for each stall from a single control panel or control area.

In another aspect of the invention, particularly where the invention is to be applied to rotary milking platforms as previously mentioned, the apparatus may include trip mechanism so as to be actuable for removal and retraction of the teat cups when a prescribed part of a revolution of the rotary milking platform has been completed e.g., the trip mechanism may be located close to an exit to the platform so that by the time the platform carrying an animal being milked completes its revolution or part thereof, and milking has been completed, the trip mechanism may be actuated and the teat cups may fall away automatically from the animal and be retracted ready for the next operation.

A selection of milking times can be obtained by a modification of this system and whereby any one of say three milking times can be selected by the operator when the cups are put on; this could be done very simply by providing a small adjustable trip lever for the trip mechanism below the outer edge part of the rotary platform and whereby the trip lever can be set to engage any one of three trip posts projecting from the floor on the remote side of the platform or other appropriate position. Cows would need to be milked normally with a second operator for a few milkings so that they could be suitably identified for milking time and this procedure could be carried out at intervals throughout lactation.

A useful alternative for providing a variation in milking time would be to use a mechanical timer unit to determine the teat cup removal point and a suitable device is a clock-work Process Timer which can be adopted to either directly or indirectly open or close a valve to operate the retraction cylinder 7 and piston 8.

The milking time would be set on the timer by the milker and when the time had expired the cups would be removed. This method would be very suitable for use in a herringbone shed where automatic removal units are used. Additional milking can be obtained where necessary by simply re-setting the timer.

In a still further alternative arrangement, switch mechanism such as electrically operable solenoid switch mechanism may be associated with a milk flow meter for each milking stall and teat cup assembly so as to be operable when the milk flow ceases or reduces to a prescribed minimum, whereupon the teat cups may be immediately automatically removed from the animal and retracted to their supported position adjacent the stall.

A relatively simple method would be to use an existing milk flow indicator and to operate a detector from this unit; to avoid the need for entry to the milk system and the difficulties associated with conduction over wet surfaces, a photo-electric system which can detect the milk level in a sight glass of the indicator would be a great advantage. Such a system is readily designed and can offer a simple control circuit with very few problems, the use of a solid-state photo-cell and a small light source can give more than adequate discrimination of milk level and the use of high-current transistor devices and a small solenoid valve to switch the pneumatic or hydraulic system for the retraction means can permit the entire system to be housed in a small box set in front of the conventional milking indicator. If a flow indicating sight-glass is used (in which the level of milk in an observation chamber indicates flow rate) a simple photo-electric detector can be used to detect the endpoint of milking; a photo-transistor and a small light source can be housed in such a way that light reflected from the milk in the sight glass falls on the phototransistor and causes a change in current to flow in the control circuit. When the sight glass clears the point where the milk level passes the position of the phototransistor, the current flow changes in the control circuit and the cup removal unit is operated via suitable relays or solenoid valves. Photo-transistors of high sensitivity are readily available for this application and integrated-circuit components are also available which are capable of operating a magnetic valve directly so that the pneumatic or hydraulic system for the retraction means can be operated directly from the control unit.

The latter system has the advantage that, provided a satisfactory milking indicator is used, the end-point detection is not involved with conductivity of the milk or any leakage over milk covered surfaces in the plant. Such a system could be relatively inexpensive, easily adjusted to a specified flow rate, and relatively foolproof in operation, and, if the entire control unit is housed in a small plug-in box, it could be easily replaced in the event of failure.

The system can operate on a milk level change of one-eighth inch which represents a change in milking rate of about one-quarter lb per minute, this is more than adequate for the detection of milking end-point. Provision can be made for manual operation by means of a switch and a time delay would be necessary in the control system to prevent the removal of the cups before the cow had started milking.

Thus, by this invention, there is provided an arrangement substantially reducing the man-power and time required in milking operations and providing a safe and effective means of automatically retracting teat cup assemblies to "home" positions on supports above ground or floor level. The preferred forms of the invention also provide that removal of the teat cups from an animal when milked can be effected automatically so that an operator is only required to place the teat cups on an animal to be milked and it is not necessary for the same or second operator to remove the teat cups; although it is to be appreciated that the arrangement may provide for the teat cups to be removed at any time manually if so required, clamp or hook means can be provided to hold the lever 9 in non-tube squeezing position.

Particular forms of the invention have been described by way of example, but it will be appreciated that other variations of and modifications to the invention can take place without departing from the scope of the appended claims. For example, the invention has been described with reference to a retractible pneumatic or hydraulic piston and cylinder arrangement but it is envisaged that such as spring or counter-balance operated mechanical retracting means may be employed, or that such as an electric winch or electric solenoid arrangement can be employed to effect retraction of the teat cup assemblies to the "home" support position and/or such as independent electrical solenoid arrangement can be employed to cut off the vacuum supply to the teat cups instead of having the vacuum cut off by the lever arrangement aforedescribed.

Further, the support arm 1 can be moved about its hinge connection 1a manually or, and as illustrated in FIG. 1, movement can be effected by means of a horizontally disposed hydraulic or pneumatic ram unit 17 having its body 17a pivotally connected to a fixed support 2a, such as another post or part of the stall wall 2, and its ram 17b pivotally connected to a bracket or like projection 18 on the support arm 1. Thus, retraction of ram 17b will move the support arm 1 to a position clear of the milking stall 3 to permit an animal to gain access to, or leave from, the stall 3; and extension of ram 17b will move the support arm 1 to an operative position behind an animal in the stall 3. Actuation, particularly retraction of ram 17b to move the support arm 1 clear of the stall 3 can be by way of a manually operated control valve or switch or trip or limit switch mechanism can be employed to move the support arm 1 clear when milking is completed and the teat cup assembly 6 removed and retracted to the "home" position. Alternatively the support arm 1 can be normally biased to a position clear of the stall 3 by such as a counter balance weight or return spring.

Further modifications may include :

1. An electronic sensing device determining the end of milking using a probe or probes inserted into a milk chamber in turn operating the teat cup support and removal means. 2. A float within a chamber which is allowed to rise and fall regulated by the flow of milk and when reduced to the desired level will activate a Magnetic or similar type of switch in turn operating the teat cup support and removal means. An alternate system can use a cup with a regulating hole in the base working within a chamber and when the milk flow reaches the desired level the cup will empty allowing it to operate a spring loaded or other switch mechanism this in turn activating the teat cup support and removal means.

I claim :

1. Teat cup support and removal means for milking apparatus comprising, a support member in the form of a substantially horizontal arm which is hingeably mounted on such as a post or wall of the stall so as to be hingeable to a position convenient for use of the apparatus in milking an animal, or hinged out of the way when not required for use; flexible pulsator and vacuum supply/milk return hoses provided for the milk cup assembly and passing to the arm at or near the hinged end thereof and extending along the length of the arm to pass from the free end of the arm to a milking claw and teat cup assembly; a pinch member mounted on said arm above the vacuum supply/milk return hose; a lever member pivotally mounted on said arm; a pressure element on said lever located below the vacuum supply/milk return hose; retractible support means associated with the support member and including a retractible flexible link engaged with the lever and connected to the teat cup assembly of milking apparatus for the stall and at a point near the teat cups; and there being a vacuum supply cut-off device associated with the retractible support means and a source of vacuum supply and operable so that the teat cup assembly can be retracted for support by the support member above the floor of the stall when vacuum supply to the teat cup assembly is cut off and the teat cups are removed from the animal after milking, retraction of the flexible link and the weight of the attached teat cup assembly simultaneously exerting pressure on the lever to pinch and close the vacuum supply/milk return hose between the pinch member and co-operating lever pressure element.

2. Teat cup support and removal means as claimed in claim 1 wherein the teat cup assembly is retractible to a "home" non-operative position by means of a pneumatically or hydraulically operable piston and cylinder arrangement, the cylinder being open at one end and the piston being movable therein towards the inner closed end by hydraulic or pneumatic pressure and the piston being connected by a flexible link, passing over a wheel or wheels, to the teat cup assembly so that movement of the piston towards the inner closed end of its cylinder will draw the flexible link in the same direction and retract the teat cup assembly.

3. Teat cup support and removal means as claimed in claim 2, wherein the cylinder is disposed vertically below the hinge connection of the arm and with its open end directed upwardly, a jockey wheel for the flexible link member being provided at the open upper end of the cylinder.

4. Teat cup support and removal means as claimed in claim 3 wherein the lever member is pivotally mounted on the arm for pivotal movement about a horizontal transverse axis disposed below the vacuum supply hose for the teat cup assembly, the lever having a portion extending outwardly and downwardly from its pivotal connection and having a pulley at its outer end over which the flexible link may pass for connection to the teat cup assembly, and the lever having a shorter other end portion directed inwardly and upwardly from the pivotal connection of the lever, said pressure element in the form of a transverse bar being located at said inner end portion and being arranged to bear against the under side of the vacuum hose supported by the support arm so that downward pressure on the outwardly extending portion of the lever will cause the inner end portion to be pivoted upwardly about its pivotal connection to compress the vacuum hose and cut off the source of vacuum supply to the teat cup assembly.

5. Teat cup support and removal means as claimed in claim 4 wherein the flexible link extends from a fixed connection at or near the open end of the cylinder, into the cylinder to be located about a pulley wheel provided on the piston and then extends out of the cylinder for location about the lever pulley and connection to the teat cup assembly.

6. Teat cup support and removal means as claimed in claim 4 wherein the support arm is in the form of an inverted channel housing within which portions of the flexible vacuum supply and milk return hoses are located, the transverse pivot connection for the lever extending between the two depending walls of the housing and the inner upwardly directed portion of the lever being movable within the housing about its pivotal connection.

7. Teat cup support and removal means as claimed in claim 6 wherein the cylinder is disposed in a horizontal position below and/or within the support arm housing and extending in the same general direction as the support arm and being movable therewith.

8. Teat cup support and removal means as claimed in claim 1 and used in conjunction with a rotary milking platform comprising a horizontal rotary platform divided to provide a plurality of milking stalls disposed about its peripheral part, the support arm being hingeably connected to a wall or post of the stall and the complete apparatus including trip mechanism actuable for removal and retraction of the teat cup assemblies when a prescribed part of a revolution of the rotary milking platform has been completed.

9. Teat cup support and removal means as claimed in claim 1 wherein the support arm is arranged to be movable about its hinged connection by means of a horizontally disposed hydraulic or pneumatic ram unit having its body pivotally connected to a fixed support adjacent the stall and its ram pivotally connected to a bracket or like projection of the support arm so that retraction of the ram will move the support arm to a position clear of the milking stall to permit an animal to gain access to, or leave from, the stall.

* * * * *